(12) United States Patent
Braun et al.

(10) Patent No.: US 6,501,953 B1
(45) Date of Patent: Dec. 31, 2002

(54) DATA TRANSMISSION BETWEEN A FIRST MOBILE SERVICES SWITCHING CENTER OF A FIRST MOBILE RADIO SYSTEM AND A SECOND MOBILE SERVICES SWITCHING CENTER OF A SECOND MOBILE RADIO SYSTEM

(75) Inventors: Achim Braun, Magstadt (DE); Thomas Rotter, Altbach (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/414,312

(22) Filed: Oct. 7, 1999

(30) Foreign Application Priority Data

Aug. 18, 1999 (EP) .............................................. 99440228

(51) Int. Cl.[7] .............................. H04Q 7/20; H04J 3/16
(52) U.S. Cl. ....................... 455/436; 455/517; 455/442; 370/465; 370/466
(58) Field of Search ................................. 455/436, 442, 455/437, 552, 553, 556, 557, 425, 422; 370/465, 466, 470, 347, 342, 467, 469

(56) References Cited

U.S. PATENT DOCUMENTS

| | | | |
|---|---|---|---|
| 5,608,779 A | | 3/1997 | Lev et al. ...................... 379/88 |
| 5,946,634 A | * | 8/1999 | Korpela et al. .............. 455/552 |
| 6,108,348 A | * | 8/2000 | Strunk et al. ................ 370/465 |
| 6,263,203 B1 | * | 7/2001 | Jahn et al. ................... 455/436 |
| 6,307,867 B1 | * | 10/2001 | Roobol et al. .............. 370/470 |

FOREIGN PATENT DOCUMENTS

| | | |
|---|---|---|
| EP | 0 836 338 A2 | 4/1998 |
| WO | WO 96/10305 | 4/1996 |
| WO | WO 96/27960 | 9/1996 |
| WO | WO 98/59513 | 12/1998 |

OTHER PUBLICATIONS

"Mobilfunk der dritten Generation" [Mobile Radio of the Third Generation] by M. Kein and S. Gneiting, "Funkshau" [Radio Show], vol. 7/99, WEKA–Verlag, Poing, Germany.

Berruto E. et al.: "Variable–Rate for the Basic Speech Service in UMTS" Proceedings of the Vehicular Technology Conference, US, New York, IEEE, Bd. CONF. 43, pp. 520–523 XP000393235 ISBN: 0–7803–1267–8.

* cited by examiner

*Primary Examiner*—Vivian Chin
*Assistant Examiner*—John J Lee
(74) *Attorney, Agent, or Firm*—Sughrue Mion, PLLC

(57) ABSTRACT

To create a connection between different mobile radio systems, data transmission between a first mobile services switching center (2GMSC) of a first mobile radio system (2G) and a second mobile services switching center (3GMSC) of a second mobile radio system (3G) is proposed, whereby the mobile services switching centers are connected through an interface (A*), via which useful data is transmitted at a variable useful data transmission rate, in which the useful data is transmitted within data frameworks including a definite pre-determined number of data fields, whereby, depending on the amount of useful data to be transmitted, at least one part of the data fields is first specified with the useful data and then the remaining part of the data fields is specified with dummy bits. Thus, a transmission channel which uses a fixed gross transmission rate (e.g., 64 kbit/s), but a variable useful data transmission rate (0–57.6 kbit/sec) is created.

12 Claims, 5 Drawing Sheets

| Octet No. | Bit No. 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 1 | N1 | N2 | N3 | N4 | N5 | M1=0 | SB |
| 3 | Z1 | 1D1 | 1D2 | 1D3 | ... | ... | ... | ... |
| 4 | ... | ... | ... | ... | ... | ... | ... | ... |
| 5 | ... | ... | ... | ... | ... | ... | ... | ... |
| 6 | ... | ... | ... | ... | ... | ... | ... | ... |
| 7 | ... | ... | 1D34 | 1D35 | 1D36 | Z2 | 2D1 | 2D2 |
| 8 | 2D3 | ... | ... | ... | ... | ... | ... | ... |
| 9 | ... | ... | ... | ... | ... | ... | ... | ... |
| 10 | ... | ... | ... | ... | ... | ... | ... | ... |
| 11 | ... | ... | ... | ... | ... | ... | ... | 2D34 |
| 12 | 2D35 | 2D36 | Z3 | 3D1 | 3D2 | 3D3 | ... | ... |
| 13 | ... | ... | ... | ... | ... | ... | ... | ... |
| 14 | ... | ... | ... | ... | ... | ... | ... | ... |
| 15 | ... | ... | ... | ... | ... | ... | ... | ... |
| 16 | ... | ... | ... | ... | 3D34 | 3D35 | 3D36 | Z4 |
| 17 | 4D1 | 4D2 | 4D3 | ... | ... | ... | ... | ... |
| 18 | ... | ... | ... | ... | ... | ... | ... | ... |
| 19 | ... | ... | 4D19 | 4D20 | ... | ... | ... | ... |
| 20 | ... | ... | ... | ... | ... | ... | ... | ... |
| 21 | ... | 4D34 | 4D35 | 4D36 | Z5 | 5D1 | 5D2 | 5D3 |
| 22 | ... | ... | ... | ... | ... | ... | ... | ... |
| 23 | ... | ... | ... | ... | ... | ... | ... | ... |
| 24 | ... | ... | ... | ... | ... | ... | ... | ... |
| 25 | ... | ... | ... | ... | ... | ... | 5D34 | 5D35 |
| 26 | 5D36 | Z6 | 6D1 | 6D2 | 6D3 | ... | ... | ... |
| 27 | ... | ... | ... | ... | ... | ... | ... | ... |
| 28 | ... | ... | ... | ... | ... | ... | ... | ... |
| 29 | ... | ... | ... | ... | ... | ... | ... | ... |
| 30 | ... | ... | ... | 6D34 | 6D35 | 6D36 | Z7 | 7D1 |
| 31 | 7D2 | 7D3 | ... | ... | ... | ... | ... | ... |
| 32 | ... | ... | ... | ... | ... | ... | ... | ... |
| 33 | ... | ... | ... | ... | ... | ... | ... | ... |
| 34 | ... | ... | ... | ... | ... | ... | ... | ... |
| 35 | 7D34 | 7D35 | 7D36 | Z8 | 8D1 | 8D2 | 8D3 | ... |
| 36 | ... | ... | ... | ... | ... | ... | ... | ... |
| 37 | ... | ... | ... | ... | ... | ... | ... | ... |
| 38 | ... | ... | ... | ... | ... | ... | ... | ... |
| 39 | ... | ... | ... | ... | ... | 8D34 | 8D35 | 8D36 |

Fig. 3A

Bit No.

| Octet No. | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 1 | N6 | N7 | N8 | N9 | N10 | M1=1 | X |
| 3 | Z1 | 1D1 | 1D2 | 1D3 | ... | ... | ... | ... |
| 4 | ... | ... | ... | ... | ... | ... | ... | ... |
| 5 | ... | ... | ... | ... | ... | ... | ... | ... |
| 6 | ... | ... | ... | ... | ... | ... | ... | ... |
| 7 | ... | ... | 1D34 | 1D35 | 1D36 | Z2 | 2D1 | 2D2 |
| 8 | 2D3 | ... | ... | ... | ... | ... | ... | ... |
| 9 | ... | ... | ... | ... | ... | ... | ... | ... |
| 10 | ... | ... | ... | ... | ... | ... | ... | ... |
| 11 | ... | ... | ... | ... | ... | ... | ... | 2D34 |
| 12 | 2D35 | 2D36 | Z3 | 3D1 | 3D2 | 3D3 | ... | ... |
| 13 | ... | ... | ... | ... | ... | ... | ... | ... |
| 14 | ... | ... | ... | ... | ... | ... | ... | ... |
| 15 | ... | ... | ... | ... | ... | ... | ... | ... |
| 16 | ... | ... | ... | ... | 3D34 | 3D35 | 3D36 | Z4 |
| 17 | 4D1 | 4D2 | 4D3 | ... | ... | ... | ... | ... |
| 18 | ... | ... | ... | ... | ... | ... | ... | ... |
| 19 | ... | ... | ... | ... | ... | ... | ... | ... |
| 20 | ... | ... | ... | ... | ... | ... | ... | ... |
| 21 | ... | 4D34 | 4D35 | 4D36 | Z5 | 5D1 | 5D2 | 5D3 |
| 22 | ... | ... | ... | ... | ... | ... | ... | ... |
| 23 | ... | ... | ... | ... | ... | ... | ... | ... |
| 24 | ... | ... | ... | ... | ... | ... | ... | ... |
| 25 | ... | ... | ... | ... | ... | ... | 5D34 | 5D35 |
| 26 | 5D36 | Z6 | 6D1 | 6D2 | 6D3 | ... | ... | ... |
| 27 | ... | ... | ... | ... | ... | ... | ... | ... |
| 28 | ... | ... | ... | ... | ... | ... | ... | ... |
| 29 | ... | ... | ... | ... | ... | ... | ... | ... |
| 30 | ... | ... | ... | 6D34 | 6D35 | 6D36 | Z7 | 7D1 |
| 31 | 7D2 | 7D3 | ... | ... | ... | ... | ... | ... |
| 32 | ... | ... | ... | ... | ... | ... | ... | ... |
| 33 | ... | ... | ... | ... | ... | ... | ... | ... |
| 34 | ... | ... | ... | ... | ... | ... | ... | ... |
| 35 | 7D34 | 7D35 | 7D36 | Z8 | 8D1 | 8D2 | 8D3 | ... |
| 36 | ... | ... | ... | ... | ... | ... | ... | ... |
| 37 | ... | ... | ... | ... | ... | ... | ... | ... |
| 38 | ... | ... | ... | ... | ... | ... | ... | ... |
| 39 | ... | ... | ... | ... | ... | 8D34 | 8D35 | 8D36 |

Fig. 3B

RLP
Bit No.

| Octet No. | 0 | 1 | 2 | 3 | 4 | 5 | 6 | 7 | |
|---|---|---|---|---|---|---|---|---|---|
| 0 | 0 | 0 | 0 | 0 | 0 | 0 | 0 | 0 | F |
| 1 | 0 | 0 | 0 | 0 | 0 | 0 | 0 | 0 | |
| 2 | 1 | C1 | C2 | C3 | C4 | C5 | M1 | M2 | |
| 3 | Z1 | 1D1 | 1D2 | 1D3 | ... | ... | ... | ... | |
| 4 | ... | ... | ... | ... | ... | ... | ... | ... | |
| 5 | ... | ... | ... | ... | ... | ... | ... | ... | |
| 6 | ... | ... | ... | ... | ... | ... | ... | ... | |
| 7 | ... | ... | 1D34 | 1D35 | 1D36 | Z2 | 2D1 | 2D2 | |
| 8 | 2D3 | ... | ... | ... | ... | ... | ... | ... | |
| 9 | ... | ... | ... | ... | ... | ... | ... | ... | |
| 10 | ... | ... | ... | ... | ... | ... | ... | ... | |
| 11 | ... | ... | ... | ... | ... | ... | ... | 2D34 | |
| 12 | 2D35 | 2D36 | Z3 | 3D1 | 3D2 | 3D3 | ... | ... | |
| 13 | ... | ... | ... | ... | ... | ... | ... | ... | |
| 14 | ... | ... | ... | ... | ... | ... | ... | ... | |
| 15 | ... | ... | ... | ... | ... | ... | ... | ... | |
| 16 | ... | ... | ... | ... | 3D34 | 3D35 | 3D36 | Z4 | |
| 17 | 4D1 | 4D2 | 4D3 | ... | ... | ... | ... | ... | |
| 18 | ... | ... | ... | ... | ... | ... | ... | ... | |
| 19 | ... | ... | ... | ... | ... | ... | ... | ... | |
| 20 | ... | ... | ... | ... | ... | ... | ... | ... | |
| 21 | ... | 4D34 | 4D35 | 4D36 | Z5 | 5D1 | 5D2 | 5D3 | |
| 22 | ... | ... | ... | ... | ... | ... | ... | ... | |
| 23 | ... | ... | ... | ... | ... | ... | ... | ... | |
| 24 | ... | ... | ... | ... | ... | ... | ... | ... | |
| 25 | ... | ... | ... | ... | ... | ... | 5D34 | 5D35 | |
| 26 | 5D36 | Z6 | 6D1 | 6D2 | 6D3 | ... | ... | ... | |
| 27 | ... | ... | ... | ... | ... | ... | ... | ... | |
| 28 | ... | ... | ... | ... | ... | ... | ... | ... | |
| 29 | ... | ... | ... | ... | ... | ... | ... | ... | |
| 30 | ... | ... | ... | 6D34 | 6D35 | 6D36 | Z7 | 7D1 | |
| 31 | 7D2 | 7D3 | ... | ... | ... | ... | ... | ... | |
| 32 | ... | ... | ... | ... | ... | ... | ... | ... | |
| 33 | ... | ... | ... | ... | ... | ... | 7D24 | 7D25 | |
| 34 | ... | ... | ... | ... | ... | ... | ... | ... | |
| 35 | 7D34 | 7D35 | 7D36 | Z8 | 8D1 | 8D2 | 8D3 | ... | |
| 36 | ... | ... | ... | ... | ... | ... | ... | ... | |
| 37 | ... | ... | ... | ... | ... | ... | ... | ... | |
| 38 | ... | ... | ... | ... | ... | ... | ... | ... | |
| 39 | ... | ... | ... | ... | ... | 8D34 | 8D35 | 8D36 | |

Rows 3–33 bracketed as I; rows 33–39 bracketed as II.

Fig. 4

DATA TRANSMISSION BETWEEN A FIRST MOBILE SERVICES SWITCHING CENTER OF A FIRST MOBILE RADIO SYSTEM AND A SECOND MOBILE SERVICES SWITCHING CENTER OF A SECOND MOBILE RADIO SYSTEM

BACKGROUND OF THE INVENTION

On the basis of the existing mobile radio systems belonging to the so-called second generation, such as the familiar mobile radio system GSM (Global System for Mobile Communications), new mobile radio systems are being developed for the so-called third generation, such as the UMTS (Universal Mobile Telecommunications System) mobile radio system, which is being developed and standardized at present through a cooperation of the worldwide telecommunications industry. In comparison to previous mobile radio systems, especially to the GSM, the UMTS should be characterized by a higher and flexible transmission rate. A package-oriented exchange technology, particularly ATM, should also preferably be included in the UMTS. In contrast, service-oriented exchange technology is primarily used in the existing mobile radio systems.

In the article "Mobilfunk der dritten Generation" [Mobile Radio of the Third Generation] by M. Kien and S. Gneiting, which was published in the journal "Funkshou" [Radio Show], volume 7/99, WEKA-Verlag, Poing, Germany, the authors write that the new mobile radio system UMTS should be constructed and developed as an addition to the existing mobile radio systems. This would not mean a simple coexistence of the different mobile radio systems. Rather the different generations of mobile radio systems should be linked so that one and the some wireless subscriber unit can be operated in the different mobile radio systems. Such a subscriber unit is known as a "multi-mode capable" subscriber unit. Not only should it be possible to operate the unit in the different mobile radio systems, but it should also be possible to hand the unit over from one mobile radio system to another during operation, particularly during a conversation or while data is being transmitted.

SUMMARY OF THE INVENTION

The goal of the present invention is to propose a procedure and equipment through which different mobile radio systems can be connected together as simply as possible, and which will fulfill the technical requirements mentioned at the beginning.

This goal is achieved according to this invention by a procedure for data transmission between a first mobile services switching center of a first mobile radio system and a second mobile services switching center of a second mobile radio system, in which the mobile services switching centers are connected via an interface through which useful data are transmitted at a variable useful data transmission rate, in which the useful data are transmitted within data frameworks, which includes a definite pre-determined number of data fields, whereby at first, depending on the amount of useful data to be transmitted, at least one part of the data fields is first encoded with the useful data and afterwards the remaining part of the data fields is encoded with dummy bits. The invention is further directed to mobile services switching centers and interface switches implementing the procedure.

Accordingly, a procedure for data transmission between a first mobile services switching center of a first mobile radio system and a second mobile services switching center of a second mobile radio system is proposed, whereby the mobile services switching centers are connected by on interface, via which useful data are transmitted at a variable useful data transmission rate, in which the useful data are transmitted within data frameworks including a definite pre-determined number of data fields, whereby, depending on the amount of useful data to be transmitted, at least one part of the data fields is first encoded with the useful data and then the remaining part of the data fields is encoded with dummy bits.

Furthermore, a mobile services switching center is proposed for a mobile radio system with an interface switch, which exchanges the useful data with another mobile services switching center of another mobile radio system, in that the interface switch sends and receives the useful data at a variable useful data transmission rate within data frameworks, whereby each data framework includes a definite pre-determined number of data fields, of which, depending on the amount of useful data to be transmitted, at least one part is first encoded with useful data and then the remaining part is encoded with dummy bits.

The present invention also proposes an interface switch for a mobile services switching center of a mobile radio system which exchanges useful data with another mobile services switching center of another mobile radio system, in that the interface switch sends and receives the useful data at a variable useful data transmission rate within data frameworks, whereby each data framework includes a definite pre-determined number of data fields, of which, depending on the amount of useful data to be transmitted, at least one port is first encoded with useful data and the remaining part is then encoded with dummy bits.

Through the measures proposed in the present invention, the mobile services switching centers of the different mobile radio systems are able to exchange useful data at a variable useful data transmission rate, that is at a variable net transmission rote, however whereby data frameworks with a definite pre-determined number of data fields are used. On the other hand, a connection with a fixed gross transmission rate determined by the number of data fields is created between the mobile services switching centers. This connection can be switched using a service-oriented switching technology, whereby it is also possible to use simpler and mostly older mobile services switching centers. By filling the data fields either with the useful data to be transmitted or with dummy bits, the data framework is only generally filled with payload to the point necessary for the momentary useful data transmission rate. This produces a connection with a variable net transmission rate, which can be adjusted to a package-oriented technology at little expense. The present invention is especially well suited for handing over a wireless subscriber unit from one mobile radio system to another, especially when the hand over involves a change from a service-oriented technology to a package-oriented technology.

One especially advantageous embodiment of the invention results from the subordinate claims:

According to these claims, it is especially advantageous to combine at least two consecutive data frameworks, whereby a signal bit in the relevant data framework indicates whether it is the first or the second of the two data frameworks. This creates double or multiple frameworks with a larger number of writeable data fields, producing a greater range of variation for the net transmission rate.

Another particular advantage is created if, beginning with the first data field of the first data framework, the data fields of the combined data frameworks are successively encoded with the useful data to be transmitted, and if the remaining data fields are encoded with dummy bits when necessary, and if the display bits of the first data framework together with those of the second data framework indicate on address marking the position up to which the combined data frameworks ore encoded with useful data. Through these measures, the useful data are encoded in an interconnected data block, whose beginning is known and whose end is determined by the amount of useful data. In order to access the transmitted useful data, it is only necessary to mark the end of the data block with display bits.

Furthermore a particular advantage is created if a wireless subscriber unit being operated in the second mobile radio system is handed over to the first mobile radio system, in that the useful data sent and received by the wireless subscriber unit via the interface is transmitted transparently, whereby the display bits indicate those data fields which are encoded with the useful data to be transmitted and/or indicate those data fields which are encoded with dummy bits. These measures allow for a quick hand over from a system using service-oriented switching technology to a system using package-oriented switching technology.

Another advantage is created if a wireless subscriber unit operated in the second mobile radio system is handed over to one operated in the first mobile radio system, in that the useful data sent and received by the wireless subscriber unit via the interface are transmitted non-transparently and according to a data link protocol selected-from various data link protocols, and if control bits indicating the selected data link protocol with which the data fields of the data framework ore encoded with the useful data, ore input in the data framework. These measures allow for a quick hand over from a system using package-oriented switching technology to a system using service-oriented switching technology.

BRIEF DESCRIPTION OF THE DRAWING

The present invention is now described in more detail using examples of the embodiment as illustrated in the following figures:

FIG. 3a/b shows the setup of a duplicate data framework for transparent data transmission;

FIG. 4 shows the setup of a data framework for non-transparent data transmission.

DETAILED DESCRIPTION OF THE INVENTION

Figure 1:
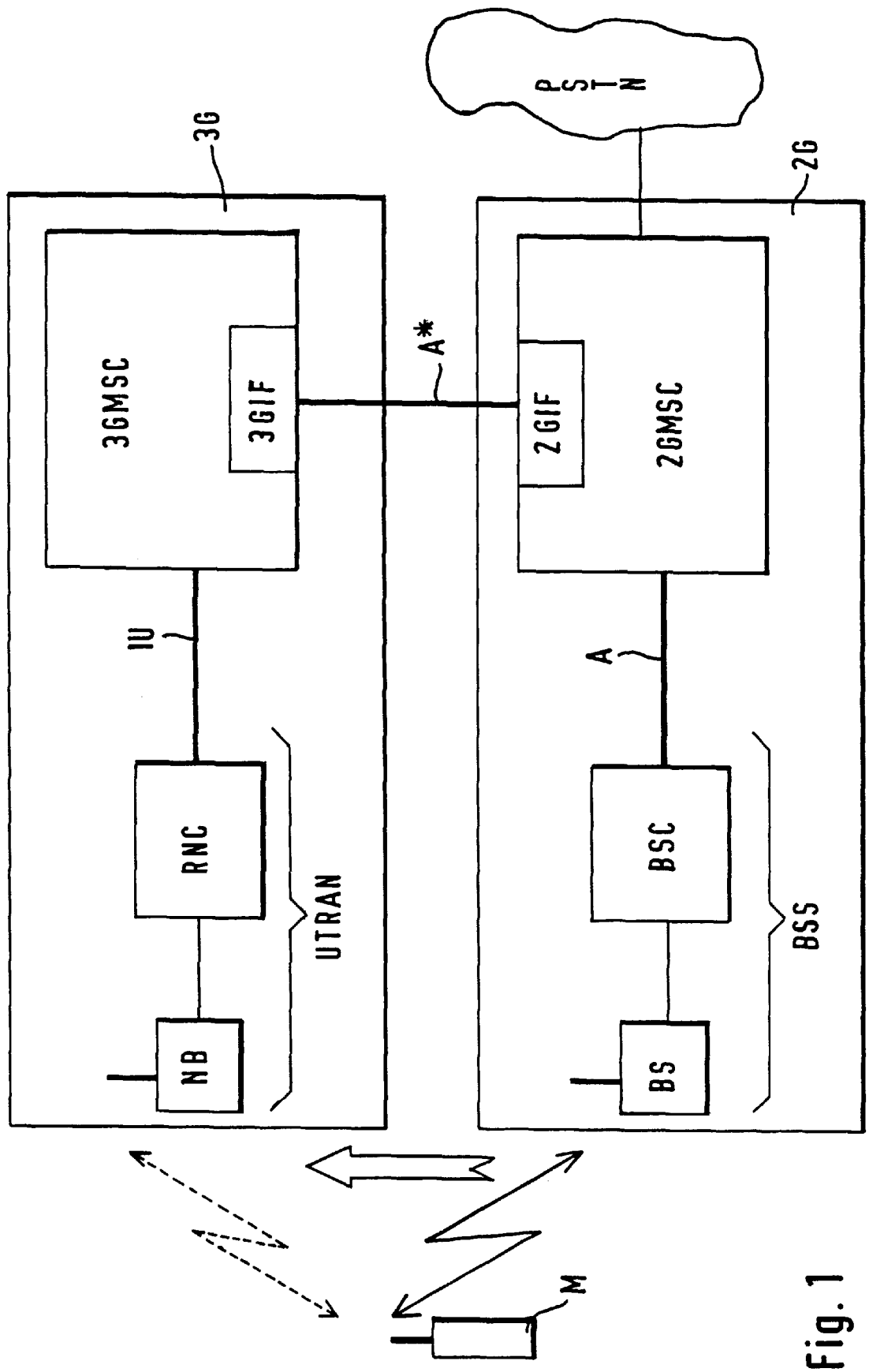
FIG. 1 shows the two linked mobile radio systems and the one subscriber unit which is being handed over.

FIG. 1 shows a first.and a second mobile radio system 2G and 3G, which are connected to one another via an interface A* in accordance with the present invention. Furthermore, FIG. 1 shows a wireless subscriber unit M, which is multi-mode capable and is initially handled by the first mobile radio system 2G and is then handed Over to the second mobile radio system 3G. The first mobile radio system 2G in this example is a mobile radio system based on the GSM standard with base stations BS, to which base station controls BSC are attached, and to which mobile services switching centers 2GMSC are attached. For the sake of simplification, only one of each of these facilities is shown here.

The base station BS and the base station control BSC form the so-called base station subsystem BSS, which is connected to the mobile services switching center 2GMSC via an interface A. This in turn produces the connection to the public telecommunications network PSTN, which mainly uses service-oriented switching technology.

The second mobile radio system 3G shown in FIG. 1 is a mobile radio system based on the UMTS standard with base stations NB, to which radio network controls RNC are attached, which are connected to the mobile services switching centers 3GMSC. Only one of each of these facilities is shown here.

The base station NB together with the radio network control RNC form the subsystem UTRAN, which is connected to the mobile services switching center 3GMSC via an interface IU. This in turn can produce a connection to the public telecommunications network, which is predominantly based on package-oriented switching technology. Package-oriented data transmission is carried out on the interface IU using the so-called AAL2 (ATM adaptation layer 2).

The two mobile radio systems are now connected via on interface A* in accordance with the present invention. The first mobile services switching center 2GMSC has an interface switch 2GIF and the second mobile services switching center 3GMSC has an interface switch 3GIF. Both interface switches are connected via a 64 kbit/s line.

In accordance with the present invention, which is described in more detail later, data is transmitted between the two mobile radio frameworks. This is especially the case if the wireless subscriber unit M is supposed to be handed over from one mobile radio system 2G or 3G to the other 3G or 2G.

FIG. 1 shows a diagram of the wireless subscriber unit M being handed over from the first mobile radio system 2G to the second mobile radio system 3G. The subscriber unit M is initially in radio contact with the first mobile radio system 2G. A connection to the public telecommunications network PSTN is produced through the first mobile services switching center 2GMSC. If the subscriber unit M changes from the coverage area of the first mobile radio system 2G to the coverage area of the second mobile radio system 3G, the connection to the public telecommunications network PSTN should be maintained. The first mobile services switching center 2GMSC therefore functions as a so-called "anchor MSC."

Handing over therefore involves an end-to-end connection between the wireless subscriber unit M and a subscriber unit of the public telecommunications network PSTN. After the hand over, this connection is routed through the second mobile services switching center 3GMSC and via the connection A* to the first mobile services switching center 2GMSC, which remains connected to the public telecommunications network PSTN.

Figure 2:
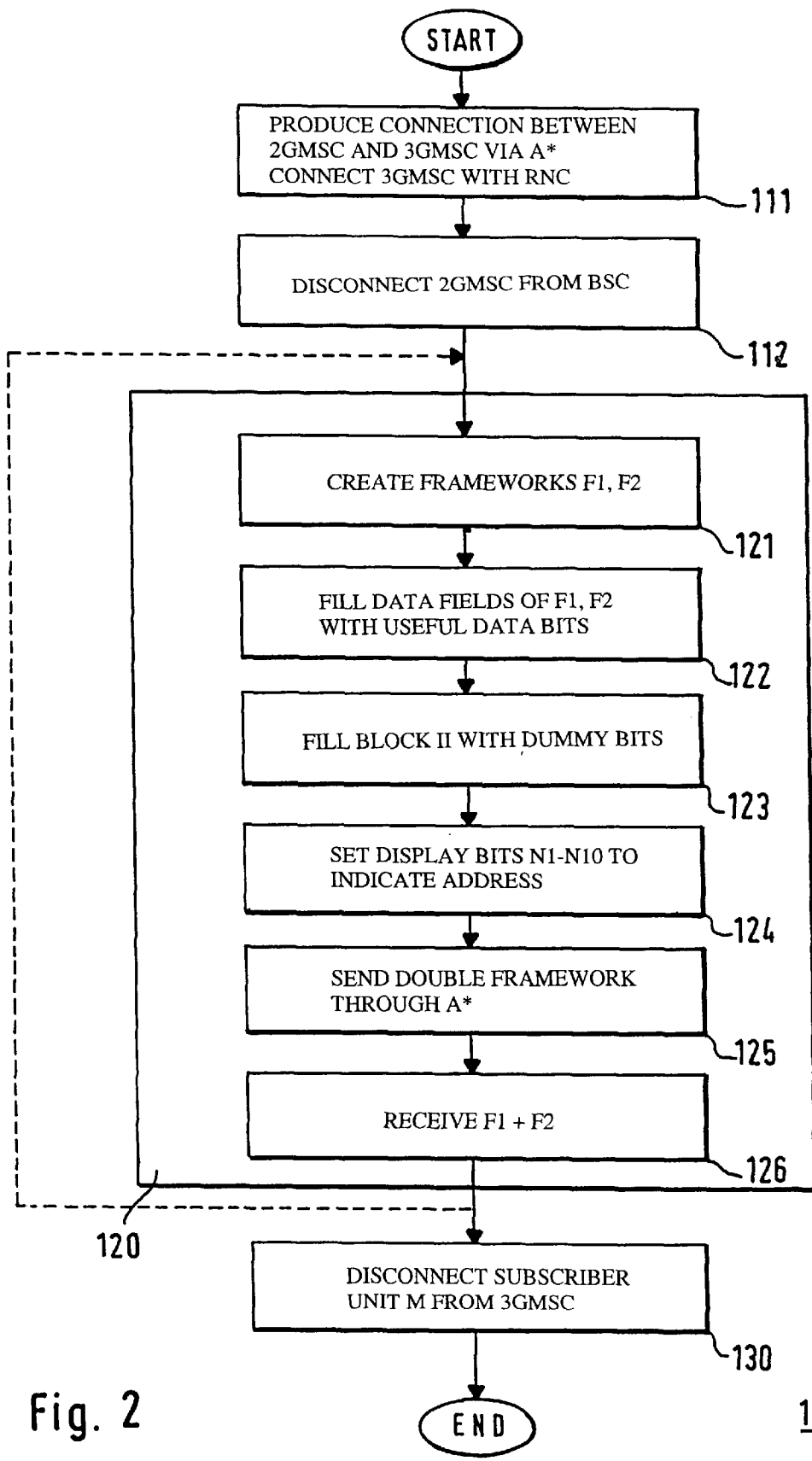
FIG. 2 shows a flow chart of the procedure for data transmission during a hand over in accordance with the present invention.

To this end, data, especially the useful data received and sent by the subscriber unit M, are transmitted via interface A* according to the procedure described in more detail in FIG. 2:

FIG. 2 shows a flow chart of the procedure in accordance with the present invention for the transmission of data between the two mobile radio frameworks 2G and 3G shown in FIG. 1. This procedure 100 includes steps 111 to 130. After the start S of the procedure, the first step 111 is carried out, in which the first mobile services switching center 2GMSC produces a connection via A* to the second mobile services switching center, which in turn produces a connection to the new radio network control RNC. In doing so, signaling channels are first switched, through which the subscriber unit M can pick up a new connection to the second mobile radio system 3G in order to register itself there. After successful registration, the connection between the first mobile services switching center and the base station control BSC is disconnected in the next step 112, so that the useful data are now transmitted via the second mobile radio system 3G and the interface A*. The transmission of the useful data takes place in the next step 120, which is divided into sub-steps 121 to 126:

The data frameworks used in the transmission of data for F1 and F2 are shown in FIGS. 3a and 3b. The following information refers to these figures. In the first sub-step 121, double frameworks are created, each of which consists of two data frameworks F1 and F2. Each data framework contains a head field, which are encoded with display bits N1, N2 . . . and answer-bock bits M1, SB. A double framework is created by setting the answer-back bit M1 in the first framework F1 to logical ZERO and the answer-back bit M1 in the second data framework F2 to logical ONE. The answer-back bit therefore indicates whether it is in the first or second data framework. Furthermore, the display bits N1 to N5 of the first data framework F1 are combined with the display bits N6 to N10 of the second data framework F2 to form a 10-valued data item corresponding to an address. The function of this address is described in more detail under substep 124.

In the next sub-step 122, the data fields of the double framework are now filled with useful data, beginning with the first data field 1D1 of the first data framework F1. Since both of the data frameworks F1 and F2 contain data fields 1D1 to 8D36 equaling 288 bits, there are therefore 2×288 bits =576 bits available. These data fields are filled with the useful data bits. In the example in FIG. 3a, only the data fields 1D1 up to and including 4D19 are filled, yielding a connected data block I with a total of (3×36+19) bits =127 bits. Block II, for which there are no more useful data bits available, is composed of the remaining date fields and is connected to data block I. Therefore only 127/576=22% of the capacity of the double framework shown in FIG. 3 is utilized. In terms of the gross quantity of 640 bits per double framework, this value amounts to only 127/640=19.8%. However, this utilization can be adjusted to the necessary useful data transmission rate.

In the next sub-step 123, block II is filled with dummy bits. All data fields within the double framework are therefore encoded.

In the next sub-step 124, the display bits N1 to N10 are now set so that they indicate the address for the data field D4D19 within the first data framework F1. The address marks the end of the useful data block I. The address enables the receiver of the double framework to immediately access the useful data stored there.

The structure of data frameworks F1 and F2 is different from the so-called A-TRAU framework of the GSM standard. In contrast to the A-TRAU framework, the frameworks shown here are only filled up to the necessary amount with useful data bits. The N1 to N10 bits described here only function as "level indicators." Each framework can be filled flexibly with 0 to 288 bits of useful data. In addition, because of the variable filling, no so-called NIC (network independent clocking) bits are required as in the GSM standard. Moreover, the double frameworks described here are used for both transparent and non-transparent data transmission. In order to differentiate it from the A-TRAU framework structure, the new framework structure should be labeled "A-TRAU*."

In sub-step 125, the double framework is then sent through interface A* shown in FIG. 1. Due to the fixed number of existing data fields, in this case 288 bits per framework, the gross transaction rate is also pre-defined. Here it amounts to 64 kbit/s. Accordingly, 100 double frameworks of 640 bits each are transmitted every second. Since the data fields are filled with useful data as required, the net transaction rate is flexible and can lie between 0 and 57.6 kbit/s.

In sub-step 126, the receiver receives the double framework F1+F2, and instantly knows how large the useful data block I is by the display bits N1 to N10. The recipient can therefore immediately access the useful data. The dummy bits ore rejected. This marks the end of the transmission of the double-framework in accordance with sub-step 120 of procedure 100 in the present invention. This step is carried out repeatedly for each additional double framework, until there is no more useful data to be transmitted and the connection is terminated.

Then in step 130, the connection between the subscriber unit M and the second mobile radio system 3G is terminated. This step completes the procedure.

The procedure shown in FIG. 2 refers to the handing over of the subscriber unit from the first mobile radio system 2G to the second mobile radio system 3G.

As another embodiment of the present invention, FIG. 4 shows data framework F for the transmission of data via interface A* in accordance with the present invention, during the hand over of the subscriber unit from the second mobile radio system 3G to the first mobile radio system 2G. In this case, the useful data are now encoded in the data framework according to a different scheme. Data framework F contains control bits C1 to C4, which are encoded in the head field of the data framework and which indicate a certain data link scheme. The data link scheme used here is named after the GSM standard "radio connection protocol," or RLP for short. According to this protocol, so-called RLP frameworks are transmitted as 576 bits or 240 bits. When transferring a long RLP framework, two single frameworks of 288 bits are completely filled. For a short framework with a length of 240 bits, only one single framework is partially filled.

Control bits C1 to C4 now indicate which one of the two data link mechanisms is used. In this example, the RLP protocol (on OSI layer 2) is used, i.e., data fields 1D1 to 7D24 ore encoded with 240 bits of useful data. These data fields form the first data block 1. The remaining data fields 7D25 to 8D36 are encoded with dummy bits and form the second data block II. Through these measures, it is possible to use a data link mechanism with a framework length of 240 bits in accordance with the RLP protocol for the non-transparent transmission of data. Furthermore it is also possible to use the RLP protocol with a framework length of 576 bits as a data link mechanism, whereby two consecutive frameworks are each encoded with 576 bits of useful data. Control bits C1 to C4 indicate which one of the different data link mechanisms is used. The selected type of data link mechanism in accordance with the RLP protocol, that is, the selected length of the RLP framework, depends on the protocol used on the physical layer (OSI layer 1). Here, either the so-called V.110 protocol or the A-TRAU protocol is used. Control bits C1 to C4 are set accordingly. The additional C5 bit is reserved for error detection.

The transmission of the data is essentially carried out by the two interface switches 2GIF and. 3GIF shown in FIG. 1. In the case of a hand over from the first system 2G to the second system 3G, interface 2GIF is carried out in the form of a so-called inter-working function (IWF). The other interface 3GIF is essentially located in a transcoder (TC).

However, the present invention is not limited to handing over multi-mode capable wireless subscriber units. Rather the procedures and equipment in accordance with the present invention can be used for any type of data transmission between different systems.

What is claimed is:

1. A method (100) for data transmission between a first mobile services switching center (2GMSC) of a first mobile radio system (2G) and a second mobile services switching center (3GMSC) of a second mobile radio system (3G), in which the mobile services switching centers (2GMSC, 3GMSC) are connected (110) via an interface (A*) through which useful data are transmitted at a variable useful data transmission rate, in which the useful data are transmitted (120) within data frameworks (F1, F2), which include a definite pre-determined number of data fields (1D1 . . . 1D36; 2D1 . . . 2D36; 8D1 . . . 8D36), whereby at first, depending on the amount of useful data to be transmitted, at least one part (1D1 . . . 4D19) of the data fields is first encoded with the useful data (122) and afterwards the remaining part (4D20 . . . 8D36) of the data fields is encoded with dummy bits (123).

2. The method (100) in accordance with claim 1, in which display bits (N1, N2, . . . ) are input (124) in each data framework (F1), indicating the part (1D1 . . . 4D19) of the data fields which is encoded with the useful data to be transmitted, and/or the remaining part (4D20 . . . 8D36) of the data fields which is encoded with dummy bits.

3. The method (100) in accordance with claim 2, in which, beginning with the first data field (1D1), the data fields are successively filled with the useful data to be transmitted (122) and, if necessary, the remaining data fields (4D20 . . . 8D36) are filled with dummy bits (123), in which each data framework (F1) contains a head field in which the display bits (N1, N2, . . . ) are entered (124), which indicate an address marking the point within the data framework (F1) up to which the data framework (F1) is filled with useful data.

4. The method (100) in accordance with claim 1, in which at least two consecutive data frameworks (F1, F2) are combined (121), in which a signal bit (M1) is entered into each of the data frameworks (F1, F2), indicating whether it is the first (F1) or the second (F2) of the two data frameworks.

5. The method (100) in accordance with claim 3, in which, beginning with the first data field (1D1) of the first data framework (F1), the data fields of the combined data frameworks (F1, F2) are filled, one after another, with the useful data to be transmitted (122) and, if necessary, the remaining data fields are filled with dummy bits (123), and in which the display bits (N1, N2, . . . ) of the first data framework (F1) together with the display bits (N6, N7, . . . ) of a second data framework (F2) indicates an address marking the point up to which the combined data frameworks (F1, F2) are filled with useful data.

6. The method (100) in accordance with claim 4, in which, beginning with the first data field (1D1) of the first data framework (F1), the data fields of the combined data frameworks (F1, F2) are filled, one after another, with the useful data to be transmitted (122) and, if necessary, the remaining data fields are filled with dummy bits (123), and in which the display bits (N1, N2, . . . ) of the first data framework (F1) together with the display bits (N6, N7, . . . ) of a second data framework (F2) indicate an address marking the point up to which the combined data frameworks (F1, F2) are filled with useful data.

7. The method (100) in accordance with claim 1, in which a wireless subscriber unit (M) operated through the first mobile radio system (2G) is handed over to the second mobile radio system (3G), in that the useful data sent and received by the wireless subscriber unit (M) via the interface (A*) is transmitted (120) transparently and within the data frameworks (F1, F2), whereby the display bits (N1, N2, . . . ) indicate the data field (1D1 . . . 4D19) which is encoded with the useful data to be transmitted and/or the data field (4D20 . . . 8D36) which is encoded with the dummy bits.

8. The method in accordance with claim 1 in which a wireless subscriber unit (M) operated through the second mobile radio system (3G) is handed over to the first mobile radio system (2G), in that the useful data sent and received by the wireless subscriber unit (M) via the interface (A*) is transmitted non-transparently and using a data link protocol which can be selected from various data link protocols (RLP), whereby the control bits (C1, C2, . . . ) are entered in the data framework (F), indicating the selected data link protocol (V110), and in which the data fields (1D1 . . . 8D36) of the data framework (F) are encoded with the useful data using the selected data link protocol (RLP).

9. A mobile services switching center (2GMSC) for a first mobile radio system (2G) with an interface switch (2GIF), which exchanges useful data with a second mobile services switching center (3GMSC) of a second mobile radio system (3G), in that the interface switch (2GIF) sends and receives the useful data at a variable useful data transmission rate within data frameworks (F1, F2), whereby each data framework (F1) includes a definite pre-determined number of data fields (1D1 . . . 1D36; 2D1 . . . 2D36; . . . 8D36), of which, depending on the amount of useful data to be transmitted, at least one part (1D1 . . . 4D19) is encoded with the useful data and the remaining part (4D20 . . . D36) is encoded with dummy bits.

10. A mobile services switching center (3GMSC) for a second mobile radio system (3G) with an interface switch (3GIF), which exchanges useful data with a first mobile services switching center (2GMSC) of a first mobile radio system (2G), in that the interface switch (3GIF) sends and receives the useful data at a variable useful data transmission rate within data frameworks (F1, F2), whereby each data framework (F1) includes a definite pre-determined number of data fields (1D1 . . . 1D36; 2D1 . . . 2D36; . . . ; 8D1 . . . 8D36), of which, depending on the amount of useful data to be transmitted, at least one part (1D1 . . . 4D19) is encoded with useful data and the remaining part (4D20 . . . 8D36) is encoded with dummy bits.

11. An interface switch (2GIF) for a mobile services switching center (2GMSC) of a first mobile radio system (2G), which exchanges useful data with a second mobile services switching center (3GMSC) of a second mobile radio system (3G), in that the interface switch (2GIF) sends and receives the useful data at a variable useful data transmission rate within data frameworks (F1, F2), whereby each data framework (F1) includes a definite pre-determined number of data fields (1D1 . . . 1D36; 2D1 . . . 2D36; . . . ; 8D1 . . . 8D36), of which, depending on the amount of useful data to be transmitted, at least one port (1D1 . . . 4D19) is encoded with useful data and the remaining part (4D20 . . . 8D36) is encoded with dummy bits.

12. An interface switch (3GIF) for a mobile services switching center (3GMSC) of a second mobile radio system (3G), which exchanges useful data with a first mobile services switching center (2GMSC) of a first mobile radio system (2G), in that the interface switch (3GIF) sends and receives the useful data at a variable useful data transmission rate within data frameworks (F1, F2), whereby each data framework (F1) includes a definite pre-determined number of data fields (1D1 . . . 1D36; 2D1 . . . 2D36; . . . ; 8D1 . . . 8D36), of which, depending on the amount of useful data to be transmitted, at least one part (1D1 . . . 4D19) is encoded with useful data and the remaining part (4D20 . . . 8D36) is encoded with dummy bits.

\* \* \* \* \*